United States Patent
Rasch et al.

(10) Patent No.: US 11,544,061 B2
(45) Date of Patent: Jan. 3, 2023

(54) ANALOG HARDWARE MATRIX COMPUTATION

(71) Applicants: INTERNATIONAL BUSINESS MACHINES CORPORATION, Armonk, NY (US); Ramot at Tel Aviv University Ltd., Tel Aviv (IL)

(72) Inventors: Malte Johannes Rasch, Chappaqua, NY (US); Oguzhan Murat Onen, Boston, MA (US); Tayfun Gokmen, Briarcliff Manor, NY (US); Chai Wah Wu, Hopewell Junction, NY (US); Mark S. Squillante, Greenwich, CT (US); Tomasz J. Nowicki, Fort Montgomery, NY (US); Wilfried Haensch, Somers, NY (US); Lior Horesh, North Salem, NY (US); Vasileios Kalantzis, White Plains, NY (US); Haim Avron, Tel-Aviv (IL)

(73) Assignees: INTERNATIONAL BUSINESS MACHINES CORPORATION, Armonk, NY (US); RAMOT AT TEL AVIV UNIVERSITY LTD., Tel-Aviv (IL)

( * ) Notice: Subject to any disclaimer, the term of this patent is extended or adjusted under 35 U.S.C. 154(b) by 0 days.

(21) Appl. No.: 17/131,034

(22) Filed: Dec. 22, 2020

(65) Prior Publication Data
US 2022/0197639 A1    Jun. 23, 2022

(51) Int. Cl.
*G06F 13/00* (2006.01)
*G06F 17/16* (2006.01)
(Continued)

(52) U.S. Cl.
CPC ........ *G06F 9/30036* (2013.01); *G06F 9/3001* (2013.01); *G06F 9/5011* (2013.01)

(58) Field of Classification Search
None
See application file for complete search history.

(56) References Cited

U.S. PATENT DOCUMENTS

| | | | |
|---|---|---|---|
| 5,428,710 A * | 6/1995 | Toomarian | G06N 3/08 706/25 |
| 9,390,383 B2 | 7/2016 | Harik | |

(Continued)

OTHER PUBLICATIONS

Cai et al., "A Low-Computation-Complexity, Energy-Efficient, and High-Performance Linear Program Solver Using Memristor Crossbars", 29th IEEE International System-on-Chip Conference: Sep. 6, 2016. pp. 317-322.

(Continued)

*Primary Examiner* — Hyun Nam
(74) *Attorney, Agent, or Firm* — Tutunjian & Bitetto, P.C.; Erik Johnson

(57) ABSTRACT

Methods and systems for solving a linear system include setting resistances in an array of settable electrical resistances in accordance with values of an input matrix. A series of input vectors is applied to the array as voltages to generate a series of respective output vectors. Each input vector in the series of vectors is updated based on comparison of the respective output vectors to a target vector. A solution of a linear system is determined that includes the input matrix based on the updated input vectors.

18 Claims, 6 Drawing Sheets

(51) Int. Cl.
*G06F 9/30* (2018.01)
*G06F 9/50* (2006.01)

(56) References Cited

U.S. PATENT DOCUMENTS

| | | | | |
|---|---|---|---|---|
| 9,646,243 | B1 | 5/2017 | Gokmen | |
| 10,031,887 | B2* | 7/2018 | Raymond | G06N 10/00 |
| 10,373,051 | B2 | 8/2019 | Gokmen et al. | |
| 10,380,485 | B2 | 8/2019 | Gokmen et al. | |
| 10,459,724 | B2* | 10/2019 | Yu | G11C 13/003 |
| 2002/0085410 | A1* | 7/2002 | Tai | G11C 11/15 |
| | | | | 365/158 |
| 2009/0088995 | A1* | 4/2009 | Tiberg | G01R 31/62 |
| | | | | 702/65 |
| 2012/0226726 | A1* | 9/2012 | Pimentel | G06F 30/327 |
| | | | | 708/270 |
| 2012/0259598 | A1* | 10/2012 | Jandhyala | G06F 30/23 |
| | | | | 703/2 |
| 2013/0093607 | A1* | 4/2013 | Yasuda | H03M 3/466 |
| | | | | 341/100 |
| 2014/0052391 | A1* | 2/2014 | Feng | G01R 21/06 |
| | | | | 702/58 |
| 2014/0217886 | A1* | 8/2014 | Knoedgen | H05B 45/37 |
| | | | | 315/307 |
| 2014/0229127 | A1* | 8/2014 | Ren | H02H 3/40 |
| | | | | 324/521 |
| 2016/0282397 | A1* | 9/2016 | Kang | H02H 3/405 |
| 2016/0336064 | A1* | 11/2016 | Seo | G06N 3/088 |
| 2016/0357884 | A1* | 12/2016 | Makarov | G06F 30/20 |
| 2017/0032062 | A1* | 2/2017 | He | G06F 30/367 |
| 2017/0040054 | A1* | 2/2017 | Friedman | G11C 7/16 |
| 2017/0108995 | A1* | 4/2017 | Ali | G06F 3/0481 |
| 2017/0109626 | A1 | 4/2017 | Gokmen et al. | |
| 2018/0321942 | A1* | 11/2018 | Yu | G06F 7/00 |
| 2019/0392316 | A1* | 12/2019 | Kim | G11C 13/0023 |
| 2020/0005865 | A1* | 1/2020 | Burr | G06N 3/049 |
| 2020/0219550 | A1* | 7/2020 | Kim | G11C 11/54 |
| 2021/0005250 | A1* | 1/2021 | Tortorelli | G11C 11/5678 |
| 2022/0197639 | A1* | 6/2022 | Rasch | G06N 3/00 |
| 2022/0280229 | A1* | 9/2022 | Howard | A61B 18/1206 |

OTHER PUBLICATIONS

Liu et al., "A Memristor-Based Optimization Framework for Artificial Intelligence Applications", IEEE Circuits and Systems Magazine. First Quarter, 2018. Feb. 9, 2018. pp. 29-44.

Sun et al., "Solving matrix equations in one step with cross-point resistive arrays", Proceedings of the National Academy of Sciences of the United States of America. vol. 116, No. 10. Mar. 5, 2019. pp. 4123-4128.

Soudry et al. "Memristor-Based Multilayer Neural Networks With Online Gradient Descent Training", IEEE Transactions on Neural Networks and Learning Systems. vol. 26, No. 10. Oct. 2015. pp. 2408-2421.

Wikipedia, "Stochastic gradient descent", https://en.wikipedia.org/w/index.php?title=stochastic_gradient_descent&oldid=938040086. Last edited: Jan. 28, 2020. Downloaded: Feb. 5, 2020. pp. 1-14.

\* cited by examiner

US 11,544,061 B2

ANALOG HARDWARE MATRIX COMPUTATION

BACKGROUND

The present invention generally relates to hardware matrix multiplication, and, more particularly, to solving linear systems and finding matrix inverses using analog hardware devices.

Matrix multiplication and inversion are important operations for a wide variety of applications that make use of linear algebra. Notably, neural network training and processing frequently makes use of these operations. However, performing such operations on large matrices can consume valuable memory and processing resources.

SUMMARY

A method for solving a linear system include setting resistances in a hardware array of settable electrical resistance devices in accordance with values of an input matrix. A series of input vectors is applied to the array as voltages to generate a series of respective output vectors as currents. Each input vector in the series of vectors is updated based on comparison of the respective output vectors to a target vector. A solution of a linear system is determined that includes the input matrix based on the updated input vectors.

A system for solving a linear system includes a hardware array of settable electrical resistance devices, a hardware processor, and a memory that stores computer program code. When the computer program code is executed by the hardware processor, it implements a solver that sets resistances in the array of settable electrical resistance devices in accordance with values of an input matrix, applies a series of input vectors to the array as voltages to generate a series of respective output vectors as currents, updates each input vector in the series of vectors based on comparison of the respective output vectors to a target vector, and determines a solution of a linear system that includes the input matrix based on the updated input vectors.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Matrix multiplication and inversion can be rapidly performed in hardware, using dedicated computation circuits. This can help relieve the burden on general-purpose processors and memory, storing the state of a matrix in a dedicated physical device. Thus, the speed of many applications that perform matrix multiplication can be greatly enhanced, as multiple component operations in the matrix multiplication can be performed in parallel. For example, neural network architectures frequently use matrix multiplication operations to process inputs that are expressed as matrices or tensors.

One matrix operation in particular, matrix inversion, may be performed in hardware using an optimization process, such as gradient descent. For example, by expressing the matrix inversion problem as an objective function, an optimization process like gradient descent may be used to quickly identify the inverse of an input matrix, with most of the processing being performed using analog hardware multiplication.

Matrix inversion may be used for a variety of applications, such as in three-dimensional transformations in computer graphics. For example, when an operation such as translation, scale, rotation, or skew is performed using a matrix operation, such an operation can readily be undone by using the inverse of the matrix. A general property of matrices is that, for an exemplary invertible matrix A, multiplication by the inverse $A^{-1}$ produces the identity matrix. Thus, $A^{-1}A=I$.

Figure 1:
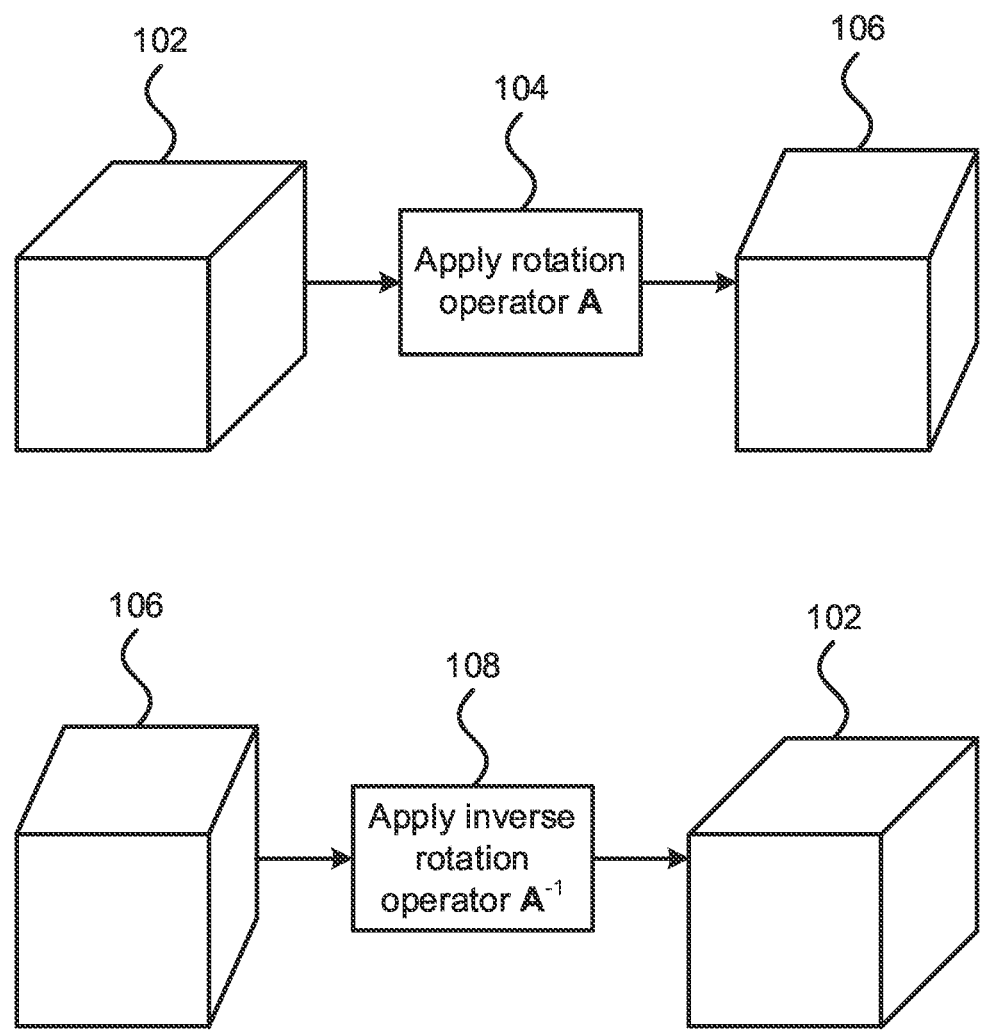
FIG. 1 is a diagram illustrating the use of a rotation operator and its inverse in a computer vision task, in accordance with an embodiment of the present invention.

Referring now to FIG. 1, a diagram is shown of how a matrix operation's inverse may be applied. An object 102 is shown in a three-dimensional space. A rotation operator 104 is applied, either to the coordinates of the constituent parts of the object 102 or to the frame of reference, and a rotated object 106 is shown as a result. This operation can then be reversed, with the rotated object 106 being rotated again using the inverse of the rotation operator 108. The outcome is a view of the original object 102.

The problem of computing the inverse of an invertible matrix $\tilde{A}$ may be expressed as finding a vector x that satisfies $\tilde{A}x(j)=\tilde{b}(j)$, where $\tilde{A} \in \mathbb{R}^{n \times n}$ is an invertible matrix and $b(j) \in \mathbb{R}^n$ is a target vector that admits 'n' different realizations. In particular, the $j^{th}$ realization of vector b(j) is equal to an n-dimensional vector which is everywhere zero except for its $j^{th}$ position, which is equal to one. The solution x(j) associated with the $j^{th}$ realization of vector b(j) is then equal to the $j^{th}$ column of the matrix inverse of matrix A. For each separate realization of vector b(j), the corresponding linear system $\tilde{A}x(j)=\tilde{b}(j)$ may be re-expressed as using an optimization process to minimize an objective function $F(x)=1/2\|\tilde{A}x(j)-\tilde{b}(j)\|_2^2$, which is equivalent to solving an equation $Ax(j)=b(j)$, where $A=\tilde{A}^T\tilde{A}$ and $b(j)=\tilde{A}^T\tilde{b}(j)$. To solve Ax=b, an approximate solution $x_0$ may be used initially, and may then be updated to produce successive approximate solutions $x_1, \ldots, x_k$ that eventually converge to $x=A^{-1}b$. In some cases, a gradient descent may be performed to optimize the objective function, but it should be understood that other forms of optimization may be used instead.

In this case, the gradient of the objective function may be expressed as $\nabla F(x)=Ax-b$. The gradient descent then provide iterative updates to the approximate solution:

$$x_{i+1}=x_i-\eta_i \nabla F(x_i)=x_i+\eta_i(b-Ax_i)$$

where $\eta_i$ is a step size that determines the speed of the gradient descent process. This process may be continued multiple iterations, for example until a difference between $x_i$ and $x_{i+1}$ falls below a threshold value, indicating convergence.

Figure 2:
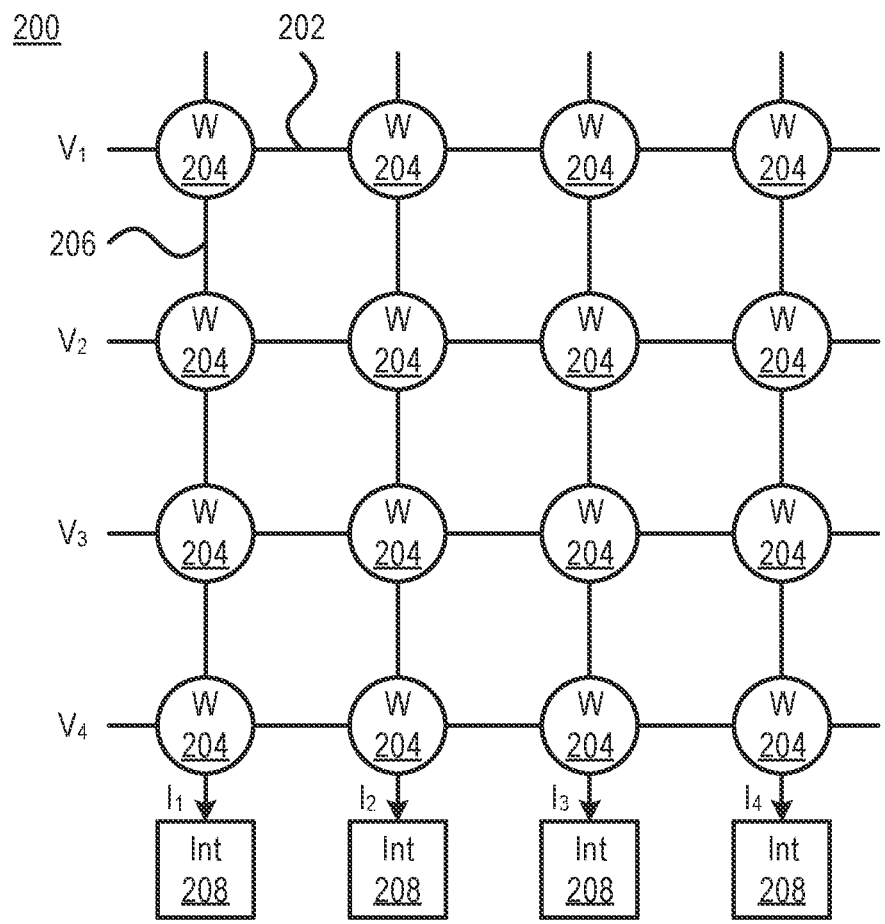
FIG. 2 is a circuit schematic of a hardware matrix multiplier that accepts a vector as input voltages and provides an output vector, using resistance values stored in an array, in accordance with an embodiment of the present invention.

Referring now to FIG. 2, a diagram of an analog crossbar array 200 is shown, suitable for performing matrix-vector multiplications. The matrix A may be represented as weight values 204, with a value from each element in the matrix being stored as a respective weight value. In this example, the array 200 can accommodate a 4×4 matrix, but it should be understood that matrices of any appropriate size may be used instead, with the number of elements in each row and column of the array 200 corresponding to the number of elements in each row and column of the matrix.

The individual weights 204 may be implemented as variable resistance devices, with the electrical resistance representing the stored value. Each weight 204 bridges a horizontal input line 202 and a vertical output line 206, such that voltages that arrive on the input line 202 are translated at each weight 204 to currents on the output line 206. The currents from each weight 204 on a given output 206 line are summed to provide a set of output currents that corresponds to the values of an output vector.

A set of voltage inputs $V_1$-$V_4$ represents values of the vector $x_i$ at a particular iteration. The output current I of a particular weight 204 is determined by Ohm's law as I=V/r, where r is the set resistance of the weight 204. The inputs may be time-coded, such that a larger input value will result in a corresponding voltage pulse that is proportionally longer in duration. Each output current may be then be processed with an integrator 208, which integrates the charge provided by the output current. To account for negative numbers, a separate array 200 may be used as a reference array. The reference array may have weight values that are set such that the difference between the main array and the reference array have roughly equal numbers of positive and negative results. Thus, values in the main array may have positive or negative values depending on a comparison to the values of the reference array.

The weights 204 may be implemented in hardware, for example using relatively complicated weighting circuitry or using resistive cross point devices. The weights 204 can belong to a class of device called a resistive processing unit (RPU). The RPU devices can be implemented with resistive random access memory (RRAM), phase change memory (PCM), programmable metallization cell (PMC) memory, or any other device that has non-linear resistive switching characteristics. Such RPU devices can also be considered as memristive systems.

To change the values stored in the weights 204, first update voltages may be applied forward on the input lines 202, and second update voltages may be applied backward on the output lines 206. The combinations of these voltages create a state change within each weight 204, causing the weight 204 to take on a new resistance value. For example, the combined voltage may cause sufficient current to flow through the weights 204 to cause a phase change within the structure of the weights. Other embodiments may be used, where the values of the weights 204 may be altered directly, rather than through intersecting voltage signals.

For complex matrices, which include a real part and an imaginary part, the values can be stored in two distinct arrays. Thus, a first array may store the real parts, while a second array may store the imaginary parts. The respective parts may then be processed separately, making it possible to obtain the conjugate transpose A* and the pseudoinverse $A^\dagger$.

Matrix multiplication that is performed in this manner has a complexity of O(1), including calculations Ax, $A^T$x, xA, and $AxA^T$. The update of the matrix via outer products also has O(1) computational complexity. For matrices that are smaller than the physical array, unused inputs may be padded by inputting "zero" voltages. For matrices that are larger than the physical array, multiple such arrays may be used in tandem to handle the different parts of the matrix.

Figure 3:
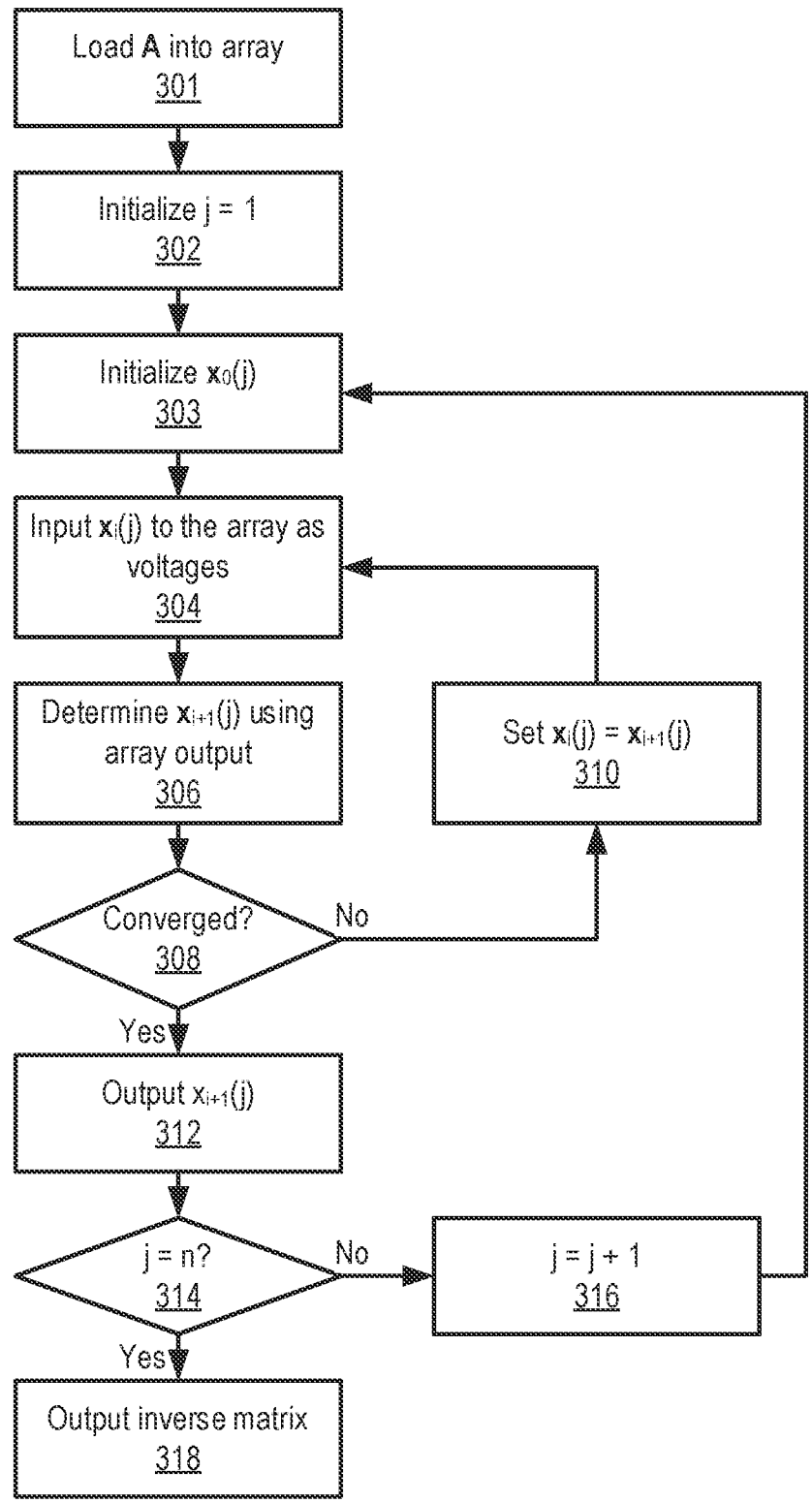
FIG. 3 is a block/flow diagram of a method for inverting a matrix using a hardware matrix multiplier, in accordance with an embodiment of the present invention.
Figure 4:
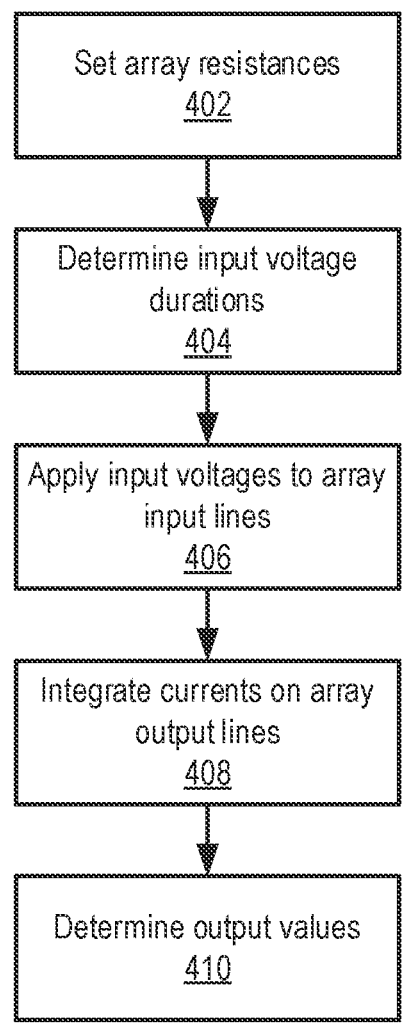
FIG. 4 is a block/flow diagram of a method of solving a linear system using a hardware matrix multiplier, in accordance with an embodiment of the present invention.

Referring now to FIG. 3, a method of finding the inverse of a matrix A is shown. At block 301, the vector A is loaded into a cross-point array 200, for example by setting the individual weights 204 to correspond to the values of each element of A. As noted above, the matrix A may be expressed as $A=\tilde{A}^T\tilde{A}$, where $\tilde{A}$ is the matrix for which an inverse is being calculated.

Block 302 initializes the counter j to one, indicating that the first column of the invoice is being processed. Block 303 initializes the starting input vector $x_0$, for example using all zeros, all ones, random numbers, or any other appropriate set of values. In some cases, an approximate set of values may already be known, and these may be used for $x_0$.

During a first iteration, the starting input matrix $x_0$ is used as $x_i$. Block 304 inputs these values to the cross-point array 200 as voltages, one column at a time, which generates a corresponding row of values in the currents output by the cross-point array 200. The values can then be reassembled into an output matrix that represents $Ax_i$.

Using this output, block 306 determines a next value $x_{i+1}(j)$. In particular, this value may be expressed as $x_{i+1}(j)=x_i(j)+\eta_i(b-Ax_i(j))$, where $b=\tilde{A}^T\tilde{b}(j)$, and $\tilde{b}(j)$ is the identity matrix, and where $\eta_i$ is a step size. Thus, the differences between the vector b and the product $Ax_i(j)$ are used to adjust the input matrix in the next iteration.

Block 308 determines whether the process has converged, for example by determining whether $x_{i+1}(j)$ is within a threshold distance of $x_n(j)$, or whether the norm of the residual $b-Ax_i(j)$. If not, then block 310 sets $x_i(j)=x_{i+1}(j)$ and the process repeats. If convergence has occurred, then block 312 identifies $x_{i+1}(j)$ as being a column of the inverse of the matrix $\tilde{A}$.

Block 314 determines whether j=n, indicating completion of the inverse matrix. If not, block 316 increments j, and processing returns to block 303. If every column has been processed, block 318 outputs the inverted matrix.

Notably, this process may include a combination of digital processing and analog processing. The matrix multiplication, in particular, may be performed as an analog operation using the cross-point array 200, while adding and subtracting matrices, and multiplying matrices by a scalar value, may be performed digitally.

Furthermore, while this process is described with a specific focus on determining the inverse, it should be understood that it may be applied more generally to other matrix multiplication problems. In particular, setting the values of $\tilde{b}(j)$ to the columns of the identity matrix generates an inverse, but $\tilde{b}(j)$ may be set to any appropriate matrix instead. Notably, by applying inputs in the reverse direction, a vector may be multiplied by the transpose of the matrix, $A^T$.

To give one example of the process, the matrix A may be defined as:

$$A = \begin{bmatrix} 0.0975 & 0.9649 & 0.4854 & 0.9157 \\ 0.2785 & 0.1576 & 0.8003 & 0.7922 \\ 0.5469 & 0.9706 & 0.1419 & 0.9595 \\ 0.9575 & 0.9572 & 0.4218 & 0.6557 \end{bmatrix}$$

During the first iteration, where j=1, the value of b(1) will be:

$$b(1) = \begin{bmatrix} 1 \\ 0 \\ 0 \\ 0 \end{bmatrix}$$

After convergence, the value of x(1) will be the first column of the inverse matrix $A^{-1}$:

$$x(1) = \begin{bmatrix} -1.3428 \\ 1.4908 \\ 1.0647 \\ -0.9001 \end{bmatrix}$$

The process is repeated n times, and in this example n=4. Thus, the final inverse matrix $A^{-1}$ for this example is:

$$A^{-1} = \begin{bmatrix} -1.3428 & 02.959 & 0.4738 & 0.8245 \\ 1.4908 & -1.1210 & -1.0109 & 0.7515 \\ 1.0647 & 0.4824 & -2.0412 & 0.9171 \\ -0.9001 & 0.8940 & 2.0966 & -1.3658 \end{bmatrix}$$

Figure 5:
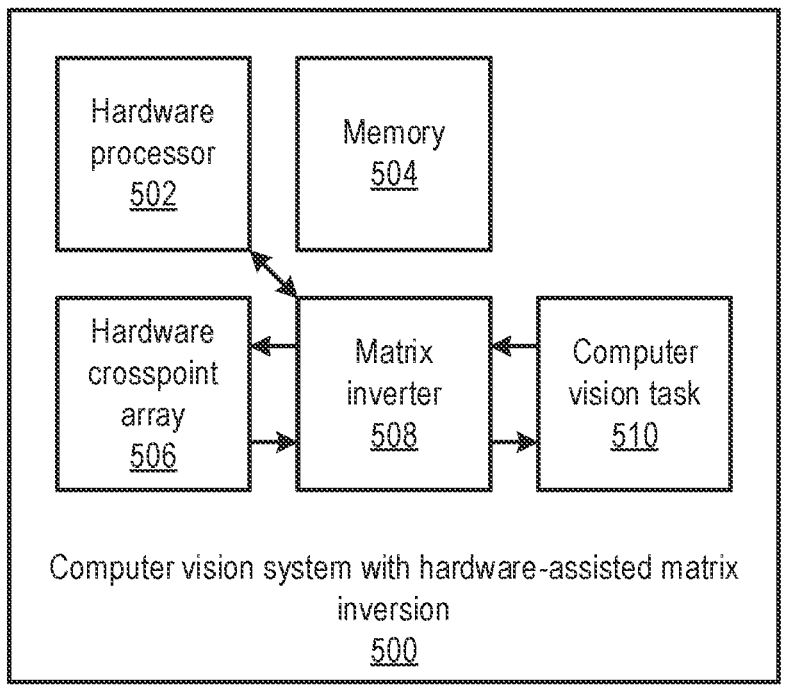
FIG. 5 is a block diagram of a computer vision system with hardware-assisted matrix inversion, in accordance with an embodiment of the present invention.

Referring now to FIG. 5, a more general method for solving a linear system is shown. As described above, block 502 sets the resistances of the array 200 in accordance with an input matrix. Block 404 then determines input voltage durations that correspond to the input vector $x_i$, for example with larger input values corresponding to longer durations of a "high" voltage. These voltages are applied on input lines 202 of the array, where they pass through the weights 204 to generate output currents on the output lines 206.

Block 408 integrates the currents on each of the array output lines 206 using integrators 208. These integrators 208 generate an output that is, e.g., proportional to a collected charge, representing the output value that corresponds to each output current. The values determined by the integrators 208 are collected into an output vector Ax in block 410. As noted above, this general process may be applied to solve a variety of linear systems.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Referring now to FIG. 5, a computer vision system 500 is shown with hardware-assisted matrix inversion. The system 500 includes a hardware processor 502 and a memory 504. Additionally, a hardware cross-point array 506 is included, for example following the architecture of the array 200 described above. Although it is specifically contemplated that such a cross-point architecture may be used, it should be understood that other architectures for the multiplication of matrices in hardware may be used instead.

A computer vision task 510 is performed, for example performing the rotation of an object in a three-dimensional space. The computer vision task 510 may include, for example, the generation of an image or video that represents the positions of objects within that space. Such tasks may include the rotation of an object, or the rotation of a camera viewpoint, within the space, which may employ a rotation matrix. The computer vision task 510 may therefore call for the reversal of a previously applied rotation, in which case the inverse of the rotation matrix may be used.

To generate such an inverse, matrix inverter 508 may perform an iterative process, as described above, using the hardware cross-point array 506 to perform matrix multiplications, and using the hardware processor 502 to update an inverse matrix (e.g., x). The matrix inverter 508 determines when there have been sufficient iterations (e.g., when the inverse matrix converges). At that point, the matrix inverter 508 supplies the final inverse matrix to the computer vision task 510 for use.

Figure 6:
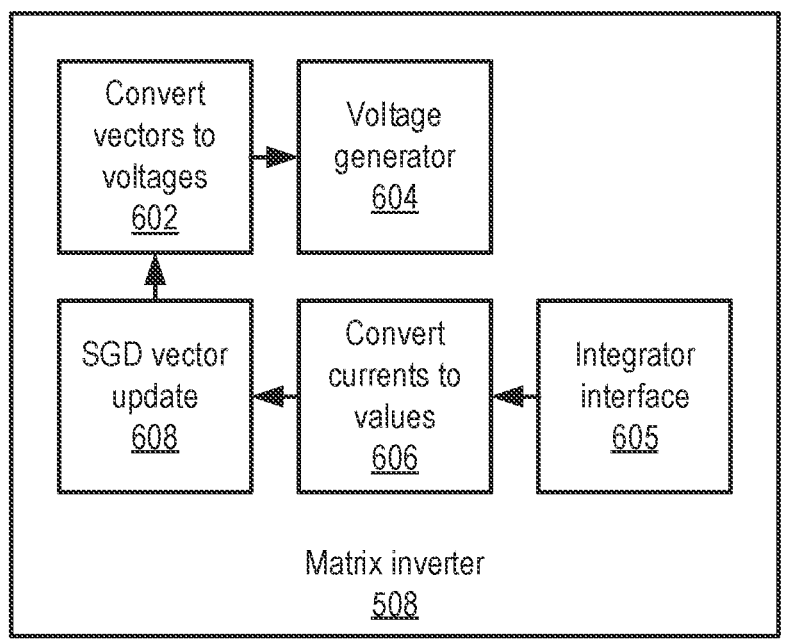
FIG. 6 is a block diagram of a solver for a linear system that uses hardware-assisted matrix calculations, in accordance with an embodiment of the present invention.

Referring now to FIG. 6, additional detail on the matrix inverter 508 is shown. The matrix inverter 508 implements a solver for a linear system. Block 602 converts an input vector (e.g., $x_i$) to a set of voltage durations. Block 604 interfaces with a voltage generator (e.g., a transistor) that outputs onto each input line of the hardware crosspoint array 506 a "high" voltage for an amount of time determined by block 602.

An integrator interface 605 reads the values of integrators on output lines of the hardware crosspoint array 506 and block 606 converts them to vectors. These outputs are used by an SGD vector update module 608 to determine updates to the input vector, which can then be used in a next iteration. This cycle may continue to iterate until the value of in the input vector converges.

Figure 7:
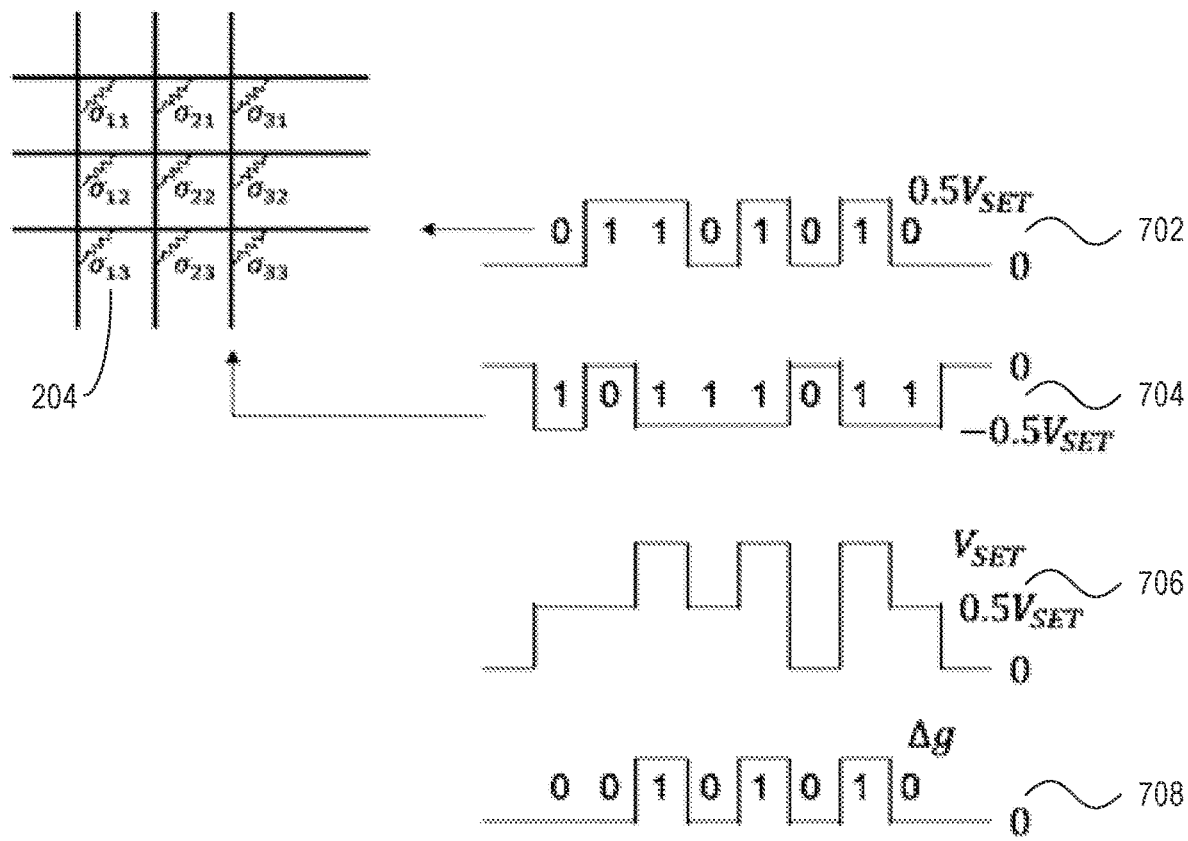
FIG. 7 is a diagram that illustrates how the weights of a hardware matrix multiplier can be set with voltages that are passed in two directions through an array of settable resistances, in accordance with an embodiment of the present invention.

Referring now to FIG. 7, a diagram shows the operation of positive weight updates for a weight 204 is shown, to update the values of the weights in the array 200. A row voltage sequence 702 is shown as a sequence of voltage pulses, one at each weight update, either having a voltage of zero or a voltage of $+0.5V_{SET}$. A column voltage sequence 704 is shown as a sequence of voltage pulses, either having a voltage of zero or a voltage of $-0.5V_{SET}$. It should be understood that these sequences represent a positive resistance change phase of the weight update. After the positive weight updates are performed, a separate set of sequences, with the polarity of the respective voltages reversed, is used to update weights in a negative direction for those weights 204 that need such correction.

At each weigh update phase, the two voltages align for a given weight 204 to produce the device voltage sequence 706, which ranges from 0 to $V_{SET}$. This results in a change in device conductance as shown in the sequence 708, where device conductance changes only when the voltage reaches $V_{SET}$, such that the device state is changed only when both transmit a '1' bit.

The numbers may be encoded as stochastic bit streams, where each bit is encoded with a voltage pulse height. In this example, 4/8 is encoded by the row voltage 702 and 6/8 is encoded by the column voltage 704. The overlapping signal 706, defined by the difference between the column and row voltages seen by the cross point device, has three voltage steps. The stored weight proportional to the product of the two stochastic numbers (here shown as 4/8×6/8=3/8) is stored as the value of the weight 204.

Having described preferred embodiments of analog hardware matrix computation (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for solving a linear system, comprising:
setting resistances in a hardware array of settable electrical resistance devices in accordance with values of an input matrix;
applying a series of input vectors to the array as voltages to generate a series of respective output vectors as currents, including integrating output currents of the array over time;
updating each input vector in the series of vectors based on comparison of the respective output vectors to a target vector; and
determining a solution of a linear system that includes the input matrix based on the updated input vectors.

2. The method of claim 1, wherein updating each input vector includes iteratively updating each input vector until the input vectors respectively converge.

3. The method of claim 2, wherein convergence is determined responsive to a difference between successive updated input vectors being below a threshold value.

4. The method of claim 2, wherein updating each input vector is performed as a stochastic gradient descent.

5. The method of claim 1, wherein setting the resistances comprises determining an array matrix A based on the input matrix Ã, where $A=Ã^{\wedge \wedge} T\ Ã$.

6. The method of claim 1, wherein setting the resistances comprises applying first voltages on input lines of the array and applying second voltages on output lines of the array, such that voltages that add to a total voltage at a settable electrical resistance that is above a threshold change the resistance value of the settable electrical resistance.

7. The method of claim 1, wherein the solution of the linear system includes an inverse of the input matrix.

8. The method of claim 7, wherein the series of input vectors includes n input vectors, and wherein the target vector is a corresponding column of the identity matrix.

9. The method of claim 1, wherein updating each input vector is based on a difference between the respective output vector and the target vector.

10. A non-transitory computer readable storage medium comprising a computer readable program for solving a linear system, wherein the computer readable program when executed on a computer causes the computer to:
set resistances in a hardware array of settable electrical resistance devices in accordance with values of an input matrix;
apply a series of input vectors to the array as voltages to generate a series of respective output vectors as currents, including integrating output currents of the array over time;
update each input vector in the series of vectors based on comparison of the respective output vectors to a target vector; and
determine a solution of a linear system that includes the input matrix based on the updated input vectors.

11. A system for solving a linear system, comprising:
a hardware array of settable electrical resistance devices that includes a set of output lines, each having a respective integrator that integrates output currents over time;
a hardware processor; and
a memory that stores computer program code which, when executed by the hardware processor, implements:
a solver that sets resistances in the array of settable electrical resistance devices in accordance with values of an input matrix, applies a series of input vectors to the array as voltages to generate a series of respective output vectors as currents based on the integrated output currents, updates each input vector in the series of vectors based on comparison of the respective output vectors to a target vector, and determines a solution of a linear system that includes the input matrix based on the updated input vectors.

12. The system of claim 11, wherein the solver iteratively updates each input vector until the input vectors respectively converge.

13. The system of claim 12, wherein convergence is determined responsive to a difference between successive updated input vectors being below a threshold value.

14. The system of claim 12, wherein the solver updates each input vector with a stochastic gradient descent.

15. The system of claim 11, wherein the solver applies first voltages on input lines of the array and applying second voltages on output lines of the array to set the resistances, such that voltages that add to a total voltage at a settable electrical resistance that is above a threshold change the resistance value of the settable electrical resistance.

16. The system of claim 11, wherein the solution of the linear system includes an inverse of the input matrix.

17. The system of claim 16, wherein the series of input vectors includes a input vectors, and wherein the target vector is a corresponding column of the identity matrix.

18. The system of claim 11, wherein the solver updates each input vector based on a difference between the respective output vector and the target vector.

* * * * *